United States Patent [19]

Pott et al.

[11] 4,279,778
[45] Jul. 21, 1981

[54] PROCESS FOR THE PREPARATION OF A SULPHIDED FLUORINE-CONTAINING NICKEL-TUNGSTEN CATALYST FOR THE CONVERSION OF HYDROCARBONS

[75] Inventors: Gerard T. Pott; Johannes C. M. Stuiver, both of Amsterdam, Netherlands

[73] Assignee: Shell Oil Company, Houston, Tex.

[21] Appl. No.: 147,693

[22] Filed: May 7, 1980

[30] Foreign Application Priority Data

Jun. 5, 1979 [NL] Netherlands ......................... 7904382

[51] Int. Cl.³ ...................... B01J 21/04; B01J 23/30; B01J 27/04; B01J 27/12

[52] U.S. Cl. ............................................... 252/439
[58] Field of Search ....................................... 252/439

[56] References Cited

U.S. PATENT DOCUMENTS

| | | | |
|---|---|---|---|
| 3,078,238 | 2/1963 | Beuther et al. | 252/439 |
| 3,673,108 | 6/1972 | Schutt | 252/439 X |
| 3,692,695 | 9/1972 | Suggitt et al. | 252/439 |

Primary Examiner—W. J. Shine
Attorney, Agent, or Firm—Ronald R. Reper

[57] ABSTRACT

A process is disclosed for preparation of a sulphided fluorine-containing nickel-tungsten catalyst having high activity in hydroconversion processes of hydrocarbons.

7 Claims, No Drawings

PROCESS FOR THE PREPARATION OF A SULPHIDED FLUORINE-CONTAINING NICKEL-TUNGSTEN CATALYST FOR THE CONVERSION OF HYDROCARBONS

BACKGROUND OF THE INVENTION

The invention relates to a process for the preparation of a sulphided fluorine-containing nickel-tungsten catalyst.

Such catalysts and a process for their preparation are known from the Netherlands patent application 7514824. As starting material for the preparation of such catalysts certain aluminum hydroxide hydrogels are used.

At least part of the fluorine is incorporated into an aluminum hydroxide hydrogel, whereupon the material is dried and calcined. The metals are incorporated into the calcined material by impregnating the latter with an aqueous solution containing a nickel and a tungsten compound.

The sulphidation, i.e., sulphiding, of the catalysts may be carried out by any method known in the art. Such catalysts have been found to be very suitable, inter alia, for the preparation of high viscosity index lubricating oils by hydrocracking a mixture of heavy hydrocarbons and for application in other processes in which hydrocarbons are converted at elevated temperature and pressure and in the presence of hydrogen. A process has now been found for the preparation of such a catalyst, in which a catalyst can be prepared which is substantially more active than that prepared by the known method. According to said process a catalyst is prepared by starting from a solution which contains a tungsten compound and an aluminum compound from which a tungsten- and aluminum-containing compound is formed.

SUMMARY OF THE INVENTION

The invention therefore relates to a process for the preparation of a sulphided, fluorine-containing nickel-tungsten catalyst, which process comprises evaporating a solution containing a tungsten compound and an aluminum compound to dryness, calcining the resultant product at a temperature from about 500° to about 700° C., then impregnating the calcined product with a nickel compound, then sulphiding and fluorinating the impregnated product.

DESCRIPTION OF PREFERRED EMBODIMENTS

The calcination temperature is preferably between 500° and 700° C. Calcination at temperatures lower than 500° C. gives an aluminum-tungsten catalyst having a large surface but a structure which collapses during sulphidation under usual conditions, which results in a catalyst having a small surface and low viscosity.

Although calcination at temperatures above 700° C. results in stable catalysts, they have too small a surface.

The atomic Al/W ratio of the aluminum and tungsten compound-containing solution preferably lies between 0.30 and 1. If a ratio outside this range is chosen, then aluminum tungsten compounds are obtained which exhibit insufficient catalytic activity.

Tungsten compounds which are used are ortho-tungstic acid, meta-tungstic acid, ammonium meta-tungstate.

Ammonium meta-tungstate is preferably used, since the unsuitable ammonium is separated from the catalyst material as $NH_3$ during the calcination treatment. Aluminum compounds which can be used are aluminum nitrate, aluminum-alpha-ethyl-acetoacetate, aluminum propoxide, aluminum isopropoxide, aluminum lactate.

Most preference is given to aluminum nitrate, since the unsuitable nitrate is separated from the catalyst material as nitrous vapors during the calcination treatment.

For the process according to the invention use is made of an aqueous solution or, if desired, a solution of a polar organic solvent.

Examples of suitable polar organic solvents are: methanol, ethanol, acetone, acetonitrile and diethyl ether.

It is also possible to prepare excellent catalysts by adding a heat-resistant porous carrier material to the tungsten and aluminum compound-containing solution. The carrier material is then impregnated with said solution.

For this purpose an alumina- and/or silica-containing carrier material is preferably used, since said material is inert and stable and also readily available. It is also possible to use other carrier materials with corresponding properties.

Sulphiding of the catalysts may be carried out by any known method. For example by contacting the catalysts with sulphur-containing gas such as a mixture of hydrogen and hydrogen sulphide. Another method is contacting the catalyst with a sulphur-containing hydrocarbon oil such as a sulphur-containing gas oil.

The fluorination of the catalyst can be carried out by any known method and for example in situ according to the process described in the Netherlands patent application 7514824 in the name of the Applicant.

This in-situ fluorination of a catalyst is carried out by adding, before or during the initial phase of the process in which the catalyst is used, a suitable fluorine compound to the gas and/or liquid stream which is passed over the catalyst.

As fluorination agent use is preferably made of an organic fluorine compound.

Examples of suitable organic fluorine compounds for said purposes are ortho-fluorotoluene and difluoroethane.

Like the catalysts prepared by known methods, the catalysts according to the present invention have been found to be particularly suitable for use in processes for the conversion of hydrocarbons at elevated temperature and pressure and in the presence of hydrogen. The invention therefore also relates to a process for the conversion of hydrocarbons.

Examples of such processes in which use is made of the catalysts according to the invention are the following:

1. the hydrocracking of heavy hydrocarbon oils such as flashed distillates for the preparation of light hydrocarbon distillates such as gasolines and kerosines.
2. the hydrogenation of aromatics present in light hydrocarbon oil distillates such as kerosines.
3. the hydro-isomerization of hydrocracking of straight-chain paraffins present in light hydrocarbon oil distillates in order to raise the octane number of said distillates.
4. the preparation of high viscosity index lubricating oils by a catalytic hydrogen treatment of heavy hydrocarbon oils such as deasphalted oils and oil-containing paraffin mixtures.

Especially for the latter process the catalyst according to the invention has been found to be particularly suitable.

In the latter case the process conditions are as follows:

| pressure | 10–200 bar |
|---|---|
| temperature | 300–450° C. |
| space velocity | 0.5–10 kg feed/l of cat./h |
| $H_2$/oil ratio | 100–5000 Nl hydrogen/kg of feed |

The invention will be further illustrated with reference to the following examples.

EXAMPLE 1

An aqueous solution of 100 g of ammonium meta-tungstate and 100 g of aluminum nitrate in 750 ml of water was evaporated to dryness. The residue was subsequently calcined at 600° C. for 24 hours.

The resultant $Al_2(WO_4)_3$, the yield of which was 106 g, was impregnated with an aqueous solution of 22 g of nickel nitrate, dried at 120° C. and sulphided at 450° C. and 10 bar by means of 10% of hydrogen sulphide in hydrogen in order to obtain a catalyst material still to be fluorinated.

The fluorination was carried out in situ by passing a heavy gas oil to which ortho-fluorotoluene had been added, at a temperature of 450° C. and a pressure of 48 bar and in the presence of hydrogen, over the catalyst material which was present as a fixed bed in a cylindrical reactor.

EXAMPLE 2

Two catalysts were prepared, in one case $Al_2(WO_4)_3$ being deposited on silicon oxide and in the other on alumina as carrier.

To prepare these catalysts 100 g of carrier was first of all impregnated with an aqueous solution of 322 g of ammonium meta-tungstate and 319 g of aluminum nitrate in a quantity of water corresponding to the pore volume of the carrier.

The product was subsequently evaporated to dryness at 120° C. and subjected to a calcination treatment at 600° C. for 24 hours. The product was then impregnated with an aqueous solution containing 70 g of nickel nitrate, and sulphided.

To test the activity of these catalysts benzene was subjected to a hydrogenation treatment at a pressure of 48 bar, an $H_2/C_6H_6$ molar ratio of 35 and an $H_2/H_2S$ molar ratio of 99. The fluorination was carried out in situ by adding 0.1% by weight of ortho-fluorotoluene to the benzene feed.

The hydrogenation activity of the catalysts is expressed by the reaction rate constant k of the hydrogenation reaction.

In view of the results stated in the Table it is clear that the hydrogenation activity of the catalysts according to the invention (a, b and c) is substantially improved in respect of the activities of the control catalysts d and e stated in the Table. These (commercially available) catalysts are prepared by impregnating an alumina carrier with a solution of a nickel salt and a tungstate.

TABLE

Activities of some $Al_2(WO_4)_3$-containing catalysts with and without a carrier, expressed as the reaction rate constant k of the hydrogenation reaction of benzene compared with those of some $Al_2O_3$-containing catalysts
T = 400° C. P = 48 bar $H_2/C_6H_6$ molar ratio = 35 $H_2/H_2S$ molar ratio = 99.

| Cat. | Composition | $ml.g^{-1}k^{h-1}$ |
|---|---|---|
| a | $Ni/Al_2(WO_4)_3$ | |
| | Ni/W = 6/100 w/w | 3.5 |
| b | $Ni/Al_2(WO_4)_3/SiO_2{}^a$ | 4.5 |
| | 14 Ni/23.4 Al/234 W/100 pbw $SiO_2$ | |
| c | $Ni/Al_2(WO_4)_3 \gamma\ Al_2O_3{}^\beta$ | |
| | 9 Ni/15.6Al/156W/100 pbw $Al_2O_3$ | 3.5 |
| d | in comparison | |
| | 100 $Al_2O_3$/15Ni/39W pbw | 2.7 |
| e | 100 $Al_2O_3$/9Ni/41W pbw | 1.8 |

$^a$surface $SiO_2$ = 330 m$^2$/g
$^\beta$surface $Al_2O_3$ = 205 m$^2$/g

What is claimed is:

1. A process for the preparation of a sulphided, fluorine-containing nickel-tungsten catalyst, which comprises evaporating to dryness a solution containing an aluminum compound and a tungsten compound wherein the atomic ratio Al/W lies in the range of 0.30–1, calcining the resultant product at a temperature from about 500° C. to 700° C., impregnating the calcined product with a solution of a nickel compound, then sulphiding and fluorinating the impregnated product.

2. A process as in claim 1 wherein the tungsten compound is ammonium meta-tungstate.

3. A process as in claim 1 wherein the aluminum compound is aluminum nitrate.

4. A process as in claim 1 which comprises adding a heat-resistant, porous carrier material to the starting tungsten and aluminum compound-containing solution.

5. A process as in claim 4, alumina-containing carrier material is added.

6. A process as in claim 4 wherein silica-containing carrier material is added.

7. A catalyst prepared according to the method of claim 1.

* * * * *